July 9, 1963  G. H. STOUTENBURG  3,096,698
APPARATUS FOR PHOTOGRAPHING THE INTERIOR OF PIPES
Filed Sept. 26, 1960
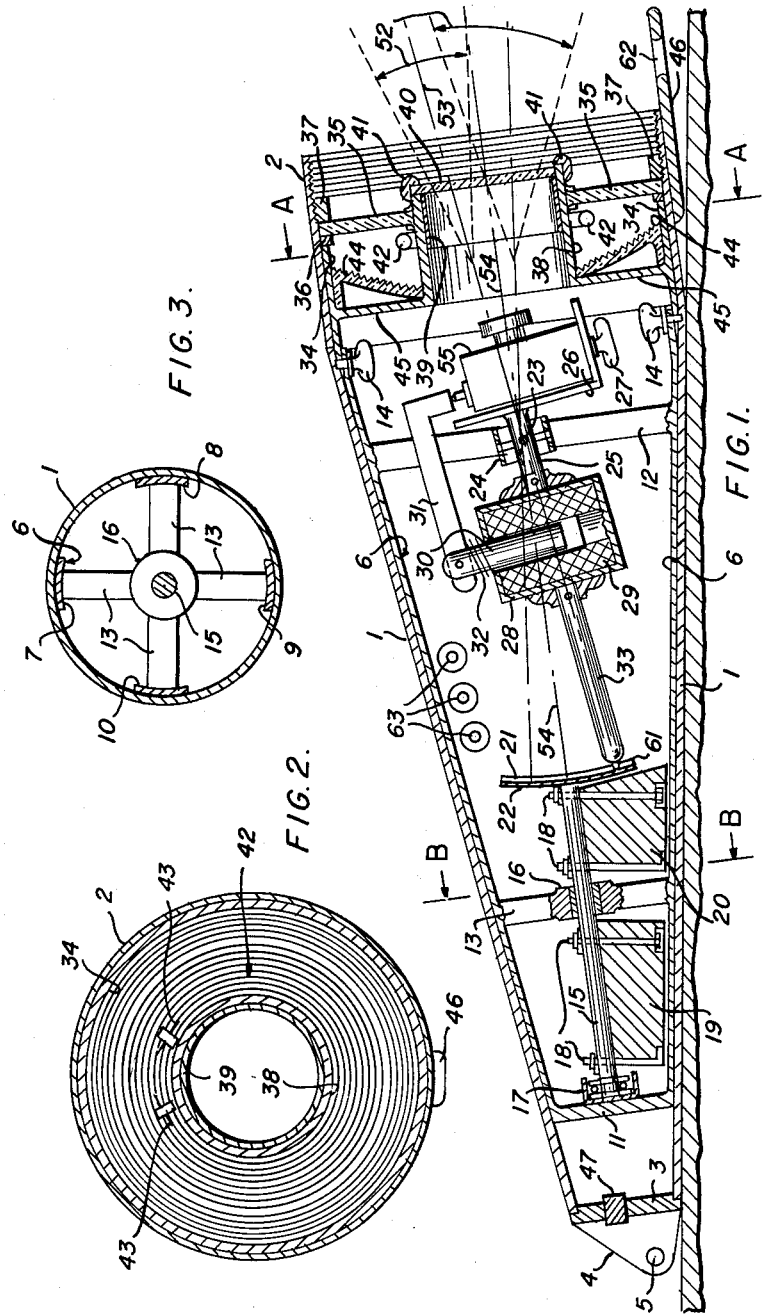
INVENTOR
GARNET H. STOUTENBURG
ATTORNEYS United States Patent Office 3,096,698
Patented July 9, 1963

3,096,698
APPARATUS FOR PHOTOGRAPHING THE INTERIOR OF PIPES
Garnet H. Stoutenburg, 215 3rd Ave. SE., Calgary, Alberta, Canada
Filed Sept. 26, 1960, Ser. No. 58,462
10 Claims. (Cl. 95—11)

This invention relates to apparatus for use with a camera for photographing the interior of pipes.

In drain pipes, sewer pipes and the like, it is frequently necessary to take photographs of the interior of the pipes in order to determine the presence, severity, and location of any cracks, leaks, partial obstructions, and off-grade portions therein. Both newly installed pipes and old conduits may be required to be photographed. A number of cameras are known which are adapted to be pulled through such pipes and to photograph the interior. However, many of these are not adapted to photograph pipes of considerably different diameter. Others do not have satisfactory means to prevent dirt from obstructing the camera's view of the interior of the pipe. Inasmuch as these cameras require electric power to produce adequate lighting for the photography of the pipe, many previous cameras have been supplied with electric power from voltage sources in the range 110 to 440 volts. The use of such a high voltage, however, has exposed such devices to the danger that sewer gas or other explosive gases might be detonated by an electric spark from the device. In addition, most pipe cameras have not had satisfactory means of aligning the camera in the pipe so that a person viewing the resultant photographs will know the direction in which the camera pointed at the time the photographs were taken. Many cameras known in the art are adapted to take photographs only with the axis of the camera lens parallel or nearly parallel to the axis of the pipe, resulting in photographs of unsatisfactory quality and degree of detail.

It is therefore an object of the present invention to provide apparatus for use with a camera which will take satisfactory photographs at a known aspect of the interior of pipes of considerably different diameters at known intervals, and at known distances from a given point, which apparatus is not subject to the danger of explosions resulting from high voltage sparks in the electric circuitry of the camera flash attachment, which does not tend to be obstructed by obstacles in the pipe, which is remotely controlled, and which is designed to prevent dirt from obstructing the camera view.

The present invention provides apparatus for use with a camera for photographing the interior of pipes, comprising a rigid, preferably liquid-tight shell, a transparent window in the shell, a pendulum weight pivotally mounted in the shell and adapted to pivot about an axis which is at an appreciable angle to the vertical when the apparatus is disposed in operating position in the pipe to be photographed. The pendulum weight, which is adapted to swing freely inside the shell regardless of the position of the shell, is attached to a camera support which swings with the pendulum. The camera support is gimbally mounted so that it may be set in different positions with respect to the pendulum weight, thereby to allow pipes of different diameters to be photographed at the optimum viewing angle. The camera support is adapted to hold a camera whose lens faces the window thereby to allow photographs of the interior of the pipe to be taken. The shell is preferably conical in shape for most of its length, and the window is preferably located at the large end of the cone, intersecting the conical axis with the surface of the window at right angles to the axis.

The invention will now be described with reference to the accompanying drawings, in which:

FIGURE 1 is a view in longitudinal section of a drain pipe camera according to the invention;
FIGURE 2 is a cross-section view along the line AA' shown in FIGURE 1; and
FIGURE 3 is a cross-sectional view along the line BB' shown in FIGURE 1.

As can be seen from FIGURE 1, the drain pipe camera includes an outer shell which consists of a truncated hollow conical portion 1 and a cylindrical section 2. A front end closure 3 seals the forward end of the conical section 1. A plug 47 in section 3 allows the entry of electrical wires, etc. (not shown) into the interior of the conical shell 1. An end bracket 4 fixed to end closure 3 is provided with a hole 5 to which a towing cable (not shown) may be attached.

Fitting snugly into the conical shell 1 is a truncated conical section 6. This section need not be completely annular in cross-section, but may instead be composed of a plurality of longitudinal strips 7, 8, 9 and 10 as shown in FIGURE 3. The strips are provided with holes at their rearward portions so that wing bolts 14 may be used to screw them firmly into the conical shell 1. Both the shell 1 and the strips 7, 8, 9 and 10 may conveniently be made of firm sheet metal, the shell being preferably constructed of a metal which will not be corroded by sewage or such matter as may be found in the pipes to be photographed.

Radial arms 13 are fixed to the longitudinal strips 7, 8, 9 and 10, and also to a bearing 16 in which a shaft 15 is supported. The axis of the shaft 15 is preferably coincident with, or nearly coincident with, the longitudinal axis of the conical shell 1.

Also firmly attached to strips 7, 8, 9 and 10 are radial supports 12 which are similar to the arms 13. The supports 12 support a gimbal pivot device 24 to which is attached a shaft 25. The pivot device 24 enables the shaft 25 to swing through several degrees from the axis of the cone in any direction, the shaft pivoting about the pivotal point 23. The shaft 25 is thus gimbally mounted about the gimbal pivot device 24, i.e. it is able to move with 3 degrees of freedom within a cone whose apex is the pivot point 23.

Attached to the shaft 25 is camera support 26 to which a camera 55 is firmly and detachably attached by means of the wing bolt 27. In operation, the lens of the camera faces the rear (right hand side) of the device. The axis of the camera lens would be parallel to the broken line 53 when the apparatus is set up in the manner shown in FIGURE 1. A window 40 fitted to the end of a protective tube 38 allows light from the pipe to strike the camera lens. The window 40 lies forward (to the left in the drawing) of the rearmost portion of the cylindrical shell 2; hence dirt falling from above or pushing up from beneath will not tend to strike the window 40.

The protective tube 38 is firmly attached to a supporting frame 45, and to a glass window 35. The heavy glass annular window 35 fits snugly against the protective cylinder 38 and the cylindrical shell 2, thus sealing the apparatus at the rear. A pressure ring 37, which is threaded on its outside cylindrical surface thereby engaging threads on the inside of cylinder 2, can be screwed in firmly so as to press the window 35 against the sealing ring 36. The sealing ring 36 is prevented from moving forward by an annular cylindrical portion 34 which is sealed to the cylindrical shell portion 2 and to the rearward portion of the conical shell 1, and which serves as a stop. A plastic sealing ring 41 insures that the junction between the lens cover glass or window 40 and the protective cylinder 38 is watertight. The cover glass 40 is prevented from moving forward by means of a stop ring 39.

The camera firmly fixed in camera support 26 is also fixed to the shaft 25, and therefore the angle which the shaft axis 53 takes with respect to the axis 54 of the conical shell 1 may be varied by causing the shaft 25 to pivot about the pivotal point 23. The shaft 25 is fixed to a solenoid device 28 which in turn is attached to a shaft 33 which is coaxial with shaft 25. The axis of the shaft 25 preferably passes through the centre of gravity of the solenoid device 28 and attached elements 30, 31 and 32. The shaft 33 is provided with a projecting bead-like extension 61 which neatly fits into a slot in the circular arc member 21. Member 21 is provided with a scale 22 and is fixed to the shaft 15 which is mounted in bearings 16 and 17. The bearing 17 is supported by plate 11 which is also attached to the strips 7, 8, 9 and 10. The position of the bead-like extension 61 in the slot in the circular arc member 21 is adjusted by adjusting two stops (not shown) fitting into the slot on either side of the bead-like extension. The adjustable stops may be moved and then set so that the angle between the axis 54 of the conical shell 1 and the shaft axis 53 (a continuation of the center axis of shafts 33 and 25) can be pre-set according to the diameter of the pipe to be photographed. In FIGURE 1, the position of axis 53 as shown is for photographing relatively large diameter pipe. The position coincident with the axis of the cone is for medium diameter pipe, and if the axis 53 were pointed along the broken line 56, the camera would be adjusted to photograph the smallest diameter of pipe which the apparatus is designed to photograph. This last mentioned position preferably corresponds to the uppermost position of the bead-like projection of shaft 33 in the circular arc member 21. It will be noted that the line 56 is not parallel to the pipe axis, but has a slight upward inclination, thus satisfying the experimental criterion that the lens axis should intersect the roof of the pipe at about 10 ft. from the lens, for good quality photographs.

The conical shape of the exterior of apparatus assists in allowing the camera lens axis to strike the roof at the proper angle. It will be further noted that the conical shape of the shell 1 enables a convenient positioning of the elements of the apparatus. For example, the pivotal axis of the shafts 15 and 25 may be conveniently located on the axis of the shell 1. The window 40 may be at the end of the device, perpendicular to the conical axis. For pictures of optimum clarity, the window should be at right angles to the lens axis. The conical taper of the shell 1 should be designed so that the camera lens axis is parallel to the conical axis for the diameter of pipe most frequently photographed.

In the shaft 15 are sunk four hanging bolts 18 which hold two solid half-cylinder-shaped lead pendulum weights 19 and 20. Since the shaft 15 moves freely in the bearings 16 and 17, the weights 19 and 20 will tend to stay next to the lower side of the shell 1, regardless of rotation of the conical shell 1 in the pipe. It is here assumed that the pipes to be photographed are horizontal or nearly horizontal. By the term "nearly horizontal" is meant sufficiently horizontal so that the force of gravity exerts an appreciable moment on the pendulum weights if they are displaced from their rest position. Thus, the arc member 21 tends to maintain a fixed position with respect to the lower surface of the pipe and accordingly shafts 33, 25 and camera support 26 also maintain a fixed alignment with respect to the pipe axis, as long as the lowermost side of the shell maintains a fixed relationship to the pipe axis. The streamlined, tapered conical structure of the shell assists the device in this respect. Accordingly, the photograph taken by the camera 55 mounted in the camera support 26 will represent a more or less fixed angle of camera axis with respect to the vertical. Thus, when photographs taken by the device are examined, the direction in which the camera pointed when the photographs were taken will be known. The direction may be varied to suit pipes of different diameter by the setting of the projecting bead 61 in the slot of the arc member 21. The window 40 should be of sufficiently large diameter to intersect the field angle 52 of the camera regardless of the position of the shaft 25 relative to the shell.

The solenoid device 28 includes a field winding 29 which, when supplied with current, causes the armature 30 to move downwards against the action of the spring 32. This causes arm 31 to open the shutter of the camera, enabling a photograph to be taken. After the shutter is closed again, the camera, which is preferably of the self winding type, winds the film to the position for the next photograph, and the spring 32 returns the armature 30 to its rest position.

The solenoid 29 may be supplied current from a plurality of ordinary flashlight batteries 63, which are connected in series with a microswitch (not shown) which is closed by means of a signal. The signal may be obtained from a two-wire insulated low voltage cable (not shown) which runs outside the pipe to an external operator and may be actuated by the operator. Alternatively, radio control or clockwork may be used to close the microswitch. The two wire insulated cable if used may conveniently be connected to the cable used for towing the apparatus through the pipe. The two wire cable may enter the inside of the conical shell 1 by means of the plug 47.

A neon gas-filled flash tube 42 may also be supplied current by the same flashlight batteries and actuated by the same microswitch as the solenoid winding 29. Into the ends of the tub 42 are sealed electrodes 43 which may be connected in series with the batteries 56 and the microswitch. The circuit for the neon tube preferably also includes a condenser and transistor amplifier (not shown). The transistor amplifier found most suitable for the flash tube is the device known under the trade name of "Highland Futuramic Flash Gun." A rough surfaced reflector 44 causes the light from the tube 42 to be reflected into the interior of the pipe.

At the rear end of the device is a bar 46 with a hole 62 to which may be attached a trailing cable, used to pull the device backwards in the event that it becomes blocked by obstructions in the pipe. However, the conical streamlined shape of the device tends to prevent it from being obstructed in its forward movement.

While a number of cameras might be fitted into the camera support 26, the camera found most suitable by the inventor is the "Robot Camera," a spring loaded self-film-transporting camera.

While the construction described above should be adequate to prevent any leakage into the device, it is generally desirable to pressurize the interior of the shell to a pressure well above atmospheric pressure to help prevent leakage and to prevent condensation of moisture on the window 40. A moisture-absorbing substance may also be provided inside the device to prevent condensation of vapour on the window 40.

In operation, the camera is positioned at one end of the pipe to be photographed and pulled by means of the towing cable towards the other end. By measuring the length of the cable pulled out of the pipe, it is possible to determine the distance which the camera has advanced from the far end of the pipe. By means of a signal from the low voltage signal cable or by other remote control means, the camera is adapted to take photographs of the pipe at preselected intervals. The camera will maintain a constant alignment because of the combination of the shape of the shell, the action of the pendulum weights, and the fixed position of the shaft 33 in the arc member 21. The position of the shaft 33 in the member 21 will have been set before the camera is positioned in the pipe, the setting depending on the diameter of the pipe.

What I claim as my invention is:

1. Apparatus for the photographing of pipes, comprising a closed substantially liquid-tight shell having a longitudinal axis of symmetry, a pendulum weight pivotally mounted inside the shell and freely rotatable about a pivotal axis which is substantially coincident with the said axis of symmetry of the shell, an arc member fixed to said pendulum weight and having a longitudinal slot therein, a shaft gimbally mounted inside the shell about a pivotal point substantially on the said axis of symmetry of the shell, said shaft having a projecting member engaging the slot and adjustably fixed in one of a plurality of positions in said longitudinal slot in said arc member, a camera support fixed to said shaft and to which a camera whose lens faces one end of the shell may be removably attached, electrically actuated trigger means for triggering the shutter of said camera and responsive to an external signal, a transparent window in said end of said shell and intersected by the axis of the lens of said camera when the camera is fixed in operating position and a flashbulb for casting light into that part of the pipe facing the camera lens and responsive to said external signal.

2. Apparatus as claimed in claim 1, wherein the greater portion of the shell has a conical taper.

3. Apparatus as claimed in claim 2, wherein the said window is substantially at right angles to the longitudinal axis of the shell and at the end of the shell nearest that conical part of the shell having the greatest diameter.

4. Apparatus for use with a camera for photographing the interior of horizontal or nearly horizontal pipes, comprising a substantially liquid-tight, closed rigid shell, a window in the shell, a pendulum weight pivotally mounted within the shell and freely pivotal about a pivotal axis nearly or substantially horizontal and nearly or substantially parallel to the longitudinal axis of the pipe to be photographed when the apparatus is in operating position within said pipe, a camera support gimbally mounted within the shell and connected to the pendulum weight and to which a camera may be removably attached so that the field angle of the camera intersects the said window thereby to enable the camera to photograph the interior of the pipe.

5. Apparatus as claimed in claim 4 additionally having means adjustably fixing the camera support in any one of a plurality of positions with respect to the pendulum weight thereby to fix the angle of the lens axis of the camera in one of a plurality of positions with respect to the pivotal axis of the pendulum weight when the camera is fixed to the camera support.

6. Apparatus as claimed in claim 5, wherein the shell is shaped as a surface of revolution for at least most of its length and the pivotal axis of the pendulum is substantially coincident with the longitudinal axis of symmetry of the shell and the camera support is gimbally mounted about a pivot point lying on said longitudinal axis of the shell.

7. Apparatus as claimed in claim 6, wherein the greater portion of said surface of revolution is a truncated cone.

8. Apparatus as claimed in claim 7, wherein the said window is a pane of glass which lies substantially at right angles to the longitudinal axis of the shell, which window is at that end of the shell nearest the conical portion of the shell having greatest diameter.

9. Apparatus as claimed in claim 8, having additionally means for attaching a towing cable to the shell.

10. Apparatus for use with a camera for photographing the interior of pipes, comprising a closed liquid-tight rigid shell having the shape of a truncated cone for most of its length, and having no parts projecting outside the curved surface of said cone, cable attachment means at the front end of the shell nearest the conical portion of minimum diameter for attachment to a towing cable, a plane glass window in the rear end of the shell nearest the conical portion of maximum diameter, said window being intersected by and substantially perpendicular to the longitudinal axis of the conical part of said shell, a first shaft pivotally mounted for free rotation about a pivotal axis substantially coincident with the longitudinal axis of the conical part of said shell, a pendulum weight fixed to said first shaft and freely rotatably about said pivoted axis, an arc member fixed to the rear part of said first shaft and having a slot therein in the shape of an arc of a circle whose centre lies on or near the longitudinal axis of the conical part of said shell, a gimbal pivotal device located on or near the longitudinal axis of the conical part of said shell and to the rear of said arc member, a second shaft mounted in said gimbal pivotal device and having a projecting member engaging the slot of said arc member, said projecting member being adjustably fixed in said slot regardless of rotation of the arc member relative to the shell, means to fix the position of the projecting member in the slot, a camera support fixed to said second shaft, said window being adapted to intersect the field angle of a camera removably attached to the camera support regardless of the position of the projecting member in the slot and regardless of the rotation of the arc member relative to the shell, an annular protective hood attached to the rear of the shell and surrounding the window and extending rearward beyond the rearmost portion of the window and spaced from the window by a distance such that the field angle of the camera is substantially unobstructed by the hood regardless of the position of the projecting member in the slot and regardless of the rotation of the arc member relative to the shell, a light flash producing means powered by a low voltage power supply and for casting light rearward so as to illuminate a section of pipe to the rear of said shell, said light flash producing means producing a flash of light in response to an external actuating means, a reflector reflecting light from said flash producing means rearward from the shell, and camera triggering means opening the shutter of the camera in response to a signal from an actuating means external to the apparatus.

References Cited in the file of this patent

UNITED STATES PATENTS

| | | |
|---|---|---|
| 863,035 | Maul | Aug. 13, 1907 |
| 2,633,783 | Laval | Apr. 7, 1953 |
| 2,909,975 | Ulrich | Oct. 27, 1959 |